United States Patent [19]

Kuwano

[11] Patent Number: 5,233,602
[45] Date of Patent: Aug. 3, 1993

[54] SWITCHING SYSTEM FOR COMPUTERS WITH 2-BIT CONDITION-REPRESENTING SIGNALS

[75] Inventor: Masahiko Kuwano, Musashino, Japan

[73] Assignee: Kabushiki Kaisha Toshiba, Kawasaki, Japan

[21] Appl. No.: 486,865

[22] Filed: Mar. 1, 1990

[30] Foreign Application Priority Data

Mar. 6, 1989 [JP] Japan .................................. 1-53351

[51] Int. Cl.$^5$ .................. H04L 5/00; G05B 23/00
[52] U.S. Cl. .............................. 370/37; 370/24; 370/32; 340/825.06; 371/9.1
[58] Field of Search ................ 370/24, 29, 31, 32, 370/11, 13, 16, 28, 36, 37, 78, 85.2, 85.3, 85.11; 395/114, 115, 117; 340/825.43, 825.59, 717, 718, 789, 825.01, 825.03, 825.06, 825.36, 825.37; 371/8.1, 9.1, 11.1, 11.3, 70; 364/187

[56] References Cited

U.S. PATENT DOCUMENTS

| | | | |
|---|---|---|---|
| 3,303,474 | 2/1967 | Moore et al. | 371/9.1 |
| 3,725,582 | 4/1973 | Davis | 370/28 |
| 3,943,283 | 3/1976 | Caragliano et al. | 370/24 |
| 4,363,121 | 12/1982 | Schlyter | 370/24 |
| 4,516,236 | 5/1985 | Hadziomerovi | 370/27 |
| 4,618,952 | 10/1986 | Bochor et al. | 370/78 |
| 4,740,952 | 4/1988 | Vernieres et al. | 370/24 |
| 4,831,617 | 5/1989 | Iwasaki | 370/16 |
| 4,841,521 | 6/1989 | Amada et al. | 370/31 |
| 4,985,886 | 1/1991 | Yomogida et al. | 370/24 |

FOREIGN PATENT DOCUMENTS 63-159436 10/1988 Japan .

OTHER PUBLICATIONS

Ronald L. Krutz, "Microprocessors and Logic Design", John Wiley & Sons, 1980, pp. 98-103.

Primary Examiner—Douglas W. Olms
Assistant Examiner—Alpus H. Hsu
Attorney, Agent, or Firm—Foley & Lardner

[57] ABSTRACT

In a switching system, two electronic appliances, such as computers, operable under an on-line condition or a standby condition, and a single condition-switching controller capable of supplying condition-switching instructions to the two electronic appliances. At the condition-switching controller, two signal lines are commonly employed for connecting these electronic appliances to the controller, and various 2-bit signals are furnished via the two signal lines to the electronic appliances. One electronic appliance recognizes that the 2-bit signals having "10" and "01" contents correspond to "the standby condition" and "the on-line condition", respectively, whereas the other electronic appliance recognizes that the 2-bit signals having "01" and "10" contents correspond to "the on-line condition" and "the standby condition", respectively.

7 Claims, 2 Drawing Sheets

SWITCHING SYSTEM FOR COMPUTERS WITH 2-BIT CONDITION-REPRESENTING SIGNALS

BACKGROUND OF THE INVENTION

1. Field of the Invention

The present invention relates to a switching system for switching, for instance, one computer operated in an on-line condition and the other computer having the same performance as that of one computer, set on standby for back-up purposes.

2. Description of the Related Art

The switching system described in the preamble is known from, for instance, Japanese KOKAI (Disclosure) Utility Model Application No. 63-159436 opened on Oct. 19, 1988.

In FIG. 1, there is shown another conventional switching system. As represented in FIG. 1, this switching system is constructed of two computers 2 and 3 which are selectively, operable under an on-line condition and also on standby for back-up purposes, and a switching controller 1 for furnishing a condition-switching instruction to these computers 2 and 3, respectively.

The switching controller 1 is connected via connectors 8A, 8B, 13A, 13B and signal lines 9A, 9B, 10A, 10B to the computers 2 and 3. From the switching controller 1, on-line/standby condition switching signals 11A and 11B, and also normal/malfunction condition signals 12A and 12B are supplied via these corresponding signal lines 9A, 9B, 10A and 10B, so that, for instance, the first computer 2 is set to the on-line condition, whereas the second computer 3 is set to the standby condition at the same time.

The above-described conventional switching system has the following problems. That is, in addition to the originally required on-line/standby condition switching signals 11A and 11B, both the normal/malfunction condition signals 12A and 12B must be sent from the switching controller 1 to the respective computers 2 and 3 in order to confirm malfunction of the switching controller 1 and a disconnection of the connectors 8A, 8B, 13A and 13B. To this end, as shown in FIG. 1, an extra circuit is necessarily required in the switching controller 1. Furthermore, it cannot be guaranteed that the computers 2 and 3 are simultaneously controlled in case of, e.g., a malfunction with the circuit arrangement shown in FIG. 1.

SUMMARY OF THE INVENTION

The present invention solves the above-described problems of a conventional switching system, and therefore, has an object to provide a switching system capable of guaranteeing a simultaneous transmission of a condition switching signal to two independent computers without requiring an extra circuit for reporting any malfunction of a switching controller or disconnection of a connector.

To achieve the above-described object, a switching system according to the present invention comprises:

a first electronic appliance (20) selectively operable under a first condition and a second condition;

a second electronic appliance (30) selectively operable under a first condition and a second condition;

one condition-switching controller (10) for simultaneously transferring 2-bit condition-switching instruction signals each having first and second contents to the first and second electronic appliances (20:30); and, first and second signal lines (40:50) connected between the condition-switching controller (10), and the first and second electronic appliances (20:30), through which said 2-bit condition-switching instruction signals are transferred, whereby the first electronic appliance (20) receives one 2-bit condition-switching instruction signal having the first content to recognize said one instruction signal as said first condition, and simultaneously the second electronic appliance (30) receives the other 2-bit condition-switching instruction having the second content to recognize the other instruction signal as said second condition.

In accordance with such a switching system, 2-bit signals are sent via two sets of commonly used signal lines from the switching controller to the respective two computers. In one computer, for instance, two 2-bit signals having contents of "10" and "01" are recognized as "a standby instruction" and "an on-line instruction", respectively. In the other computer, two 2-bit signals having contents of "01" and "10" are recognized as "an on-line instruction" and "a standby instruction", respectively. As a result, the simultaneous transmission of the condition-switching signals can be guaranteed.

Furthermore, when another 2-bit signal having a content of "11" is used to recognize "a software error" occurring in the switching controller, both of these computers can recognize an occurrence of the software error in the switching controller without any additional circuit. In addition, when the remaining 2-bit signal having a content of "00" is used to recognize "a disconnection of a connector"(referred to as "a hardware error"), both of the computers can recognize the disconnection of the connector without any additional circuit.

BRIEF DESCRIPTION OF THE DRAWINGS

For a better understanding of the present invention, reference is made to the following description in conjunction with the accompanying drawings, in which.

DETAILED DESCRIPTION OF THE PREFERRED EMBODIMENTS

Basic Idea

A basic idea of the present invention will now be described.

In a switching system according to the present invention, there are provided two electronic appliances, such as computers, selectively operable under an on-line condition, and also on a standby condition; and a single condition-switching controller capable of simultaneously supplying condition-switching instructions to the two electronic appliances. At the condition-switching controller, two signal lines are commonly employed for connecting these electronic appliances to the controller, and various 2-bit signals are furnished via the two signal lines to the electronic appliances. One electronic appliance recognizes that the 2-bit signals having "10" and "01" contents correspond to "the standby condition" and "the on-line condition" respectively, whereas the other electronic appliance recognizes that the 2-bit signals having "01" and "10" contents correspond to "the on-line condition" and "the standby condition", respectively.

Furthermore, both the electronic appliances can recognize that the remaining 2-bit signals having "11" and "00" contents correspond to "the malfunction of the condition-switching controller" and "disconnection of the connectors", respectively.

Arrangement of Duplexing System

Figure 1:
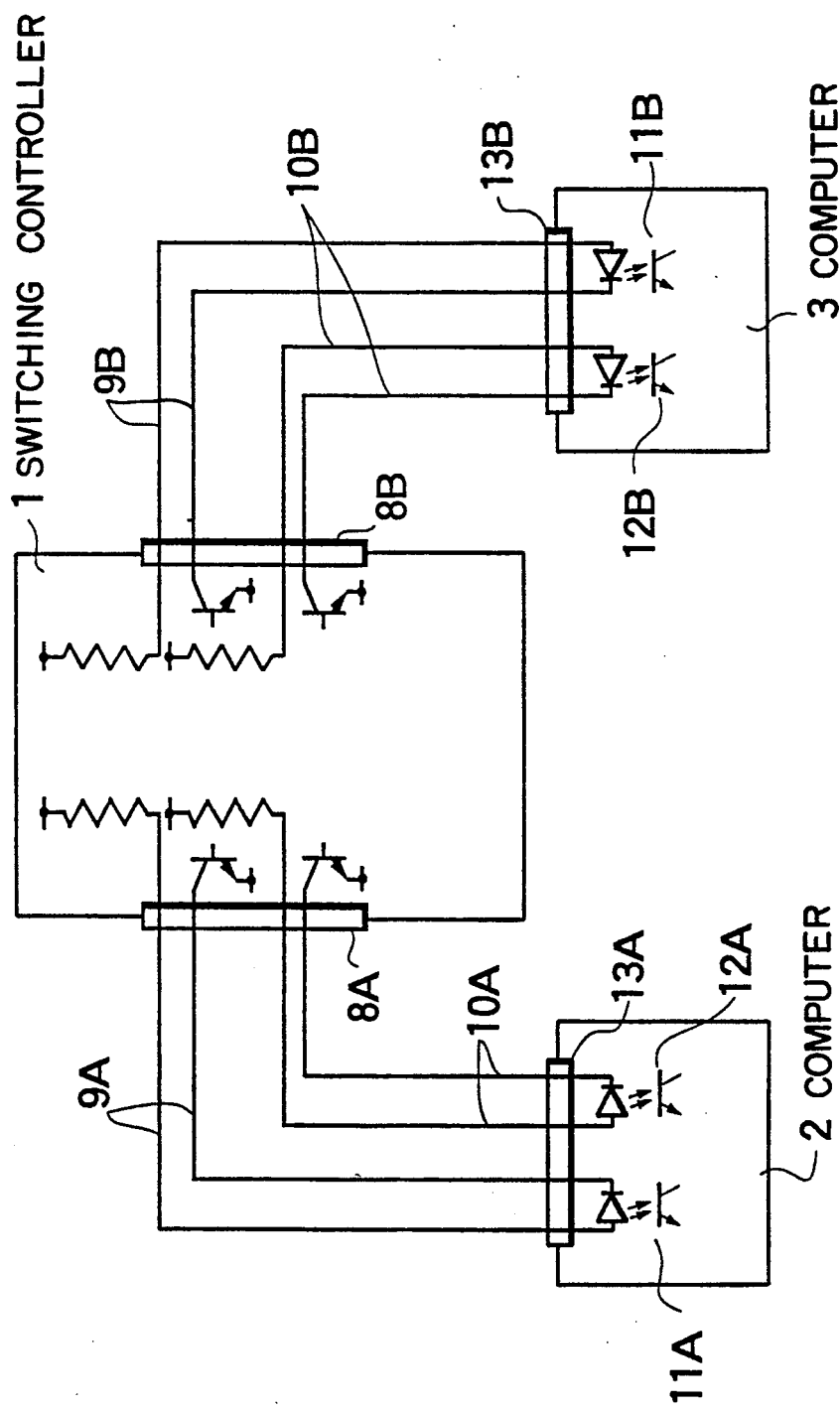
FIG. 1 is a schematic block diagram of a conventional switching system.
Figure 2:
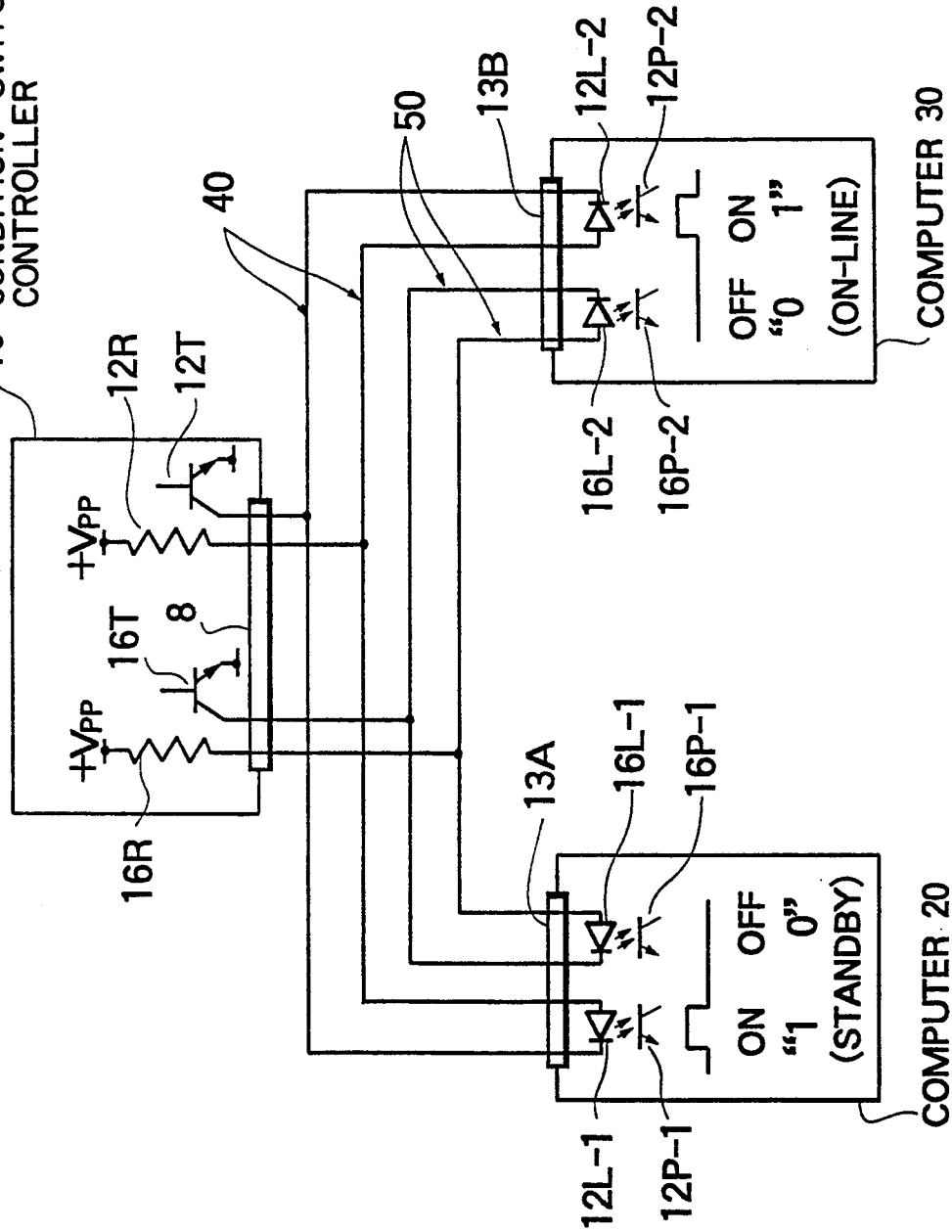
FIG. 2 is a schematic block diagram of a switching system according to a preferred embodiment of the present invention.

FIG. 2 is a schematic block diagram for representing a switching system according to a preferred embodiment of the present invention.

As represented in FIG. 2, this switching system is arranged by two computers 20 and 30 each selectively operable under an on-line condition and on a standby condition, and also a single condition-switching controller 10 capable of simultaneously supplying condition-switching instructions to both of the first and second computers 20 and 30.

Furthermore, in accordance with this switching system, two signal lines 40 and 50 are commonly employed so as to connect the condition-switching controller 10 via connectors 8, 13A and 13B to two computers 20 and 30. Accordingly, predetermined 2-bit signals, e.g., "10" and "01" are simultaneously furnished from the condition-switching controller 10 to the first and second computers 20 and 30 via the common signal lines 40 and 50.

The first computer 20 recognizes the above-described 2-bit signals of "10" and "01" as "a standby instruction" and "an on-line instruction", respectively, whereas the second computer 30 recognizes the 2-bit signals of "01" and "10" as "an on-line instruction" and "a standby instruction", respectively.

Moreover, both of the first and second computers 20 and 30 recognizes one remaining 2-bit signal of "11" as a software error occurring in the condition-switching controller 10, and also the other remaining 2-bit signal of "00" as disconnections of the connectors 13A and 13B for the two signal lines 40 and 50 (referred to as a "hardware error").

The above-described signal transmission is carried out by way of so-called "multi drop system".

Switching Operation

An overall operation of the switching system with the above-described arrangement will now be explained.

When the contents of the 2-bit signals to be transferred via the two signal lines 40 and 50 are set to, for instance, "10" in the condition-switching controller 10, the 2-bit signal of "10" is simultaneously transferred to the first computer 20, whereas the 2-bit signal of "01" is transferred to the second computer 30 simultaneously. That is, "1" signal is transferred from the condition-switching controller 10 via one signal line 40 to the first computer 20 and simultaneously "0" signal is transferred therefrom via another signal line 50 thereto.

Precisely speaking, when a preselected drive voltage is applied to a base electrode of a first NPN switching transistor 12T employed in the condition-switching controller 10, since a forward bias voltage has been applied from a positive power source Vpp via a collector resistor 12R between the collector and emitter of this switching transistor 12T, the switching transistor 12T is turned ON and therefore a first LED (light emitting diode) 12L-1 employed in the first computer 20 and connected as the collector load of this switching transistor 12T is similarly turned ON. Thus, a light output is supplied to the first phototransistor 12P-1 so that as represented in FIG. 2, an ON-signal (corresponding to "1" signal) having a predetermined amplitude is produced from the phototransistor 12P-1. At the same time, since this first LED 12L-1 is connected to another first LED 12L-2 employed in the second computer 30 via the common signal line 40, an ON-signal is optically generated by the first LED 12L-2, and transferred to and thus derived from the second phototransistor 12P-2.

On the other hand, at the same time, since no drive voltage is applied to a base electrode of a second NPN switching transistor 16T, even when a forward bias voltage is being applied via a collector resistor 16R from another positive power source Vpp to the collector thereof, this second NPN switching transistor 16T is turned OFF. As a result, both a second LED 16L-1 employed in the first computer 20 and another second LED 16P-2 employed in the second computer 30 are turned OFF. As a consequence, corresponding second phototransistors 16P-1 and 16P-2 each outputs an OFF signal (corresponding to "0" signal). That is, one 2-bit signal of "10" is derived from the first and second phototransistors 12P-1 and 16P-1 employed in the first computer 20, whereas another 2-bit signal of "01" is derived from the first and second phototransistors 12L-2 and 16P-2 employed in the second computer 30 at the same instant, as represented in FIG. 2.

Accordingly, the first computer 20 is brought into the standby condition(by"10" state) and simultaneously the second computer 30 is brought into the on-line condition (by"01" state). As a result, the first computer 20 is set on the standby condition and simultaneously the second computer 30 is set to the on-line condition, whereby a terminal unit (not shown in detail) can be operated with the second computer 30 under the on-line state. Thus, if this second computer 30 is brought into the malfunction, the first computer 20 which is under the standby condition can be immediately communicated with the terminal unit instead of the second computer 30, because the condition-switching controller 10 newly transfers the 2-bit signal of "01" to the first computer 20 and the 2-bit signal of "10" to the second computer 30. In other words, the first computer 20 under the standby condition can function as a back-up computer for the second computer 30 being operated under the on-line condition.

Moreover, according to the preferred embodiment, both the first and second computers 20 and 30 are not simultaneously operated under the on-line condition, but also simultaneously under the standby condition.

When the above-described operation conditions are varied, the condition-switching controller 10 sends another 2-bit signal of "01" to the first computer 20 and simultaneously transfers the 2-bit signal of "10" to the second computer 30, so that the first computer 20 is set to the on-line condition and also the second computer 30 is set to the standby condition.

Furthermore, when the software error occurs in the condition-switching controller 10, a new 2-bit signal of "11" is simultaneously transferred therefrom to both the first and second computers 20 and 30. Then, both the first and second computers 20 and 30 can recognize by this 2-bit signal of "11" that the software error occurs in the switching controller 10.

Also, in case that, for instance, the connector 13A of the second signal line 50 for the first computer 20 is disconnected therefrom, a 2-bit signal received by the first computer 20 becomes "00" (i.e., both the first and second LEDs 12L-1 and 16L-1 are turned OFF), whereas the 2-bit signal can be received in a normal condition by the second computer 30. Under such a circumstance, it can be readily recognized according to the present invention that only the connector 13A for the first computer 20 is disconnected therefrom.

As previously described, in accordance with the multi drop method of the preferred embodiment, both the on-line instruction and standby instruction can be simultaneously transferred to the first and second computers 20 and 30, and furthermore both the software error occurring in the condition-switching controller 10, and the disconnections of the connectors 13A and 13B can be surely transferred to both the first and second computers 20 and 30 without additionally utilizing any extra signal line.

Although two computers 20 and 30 were employed in the switching system according to the preferred embodiment, the present invention is not limited to these computers, but may be applied to various types of dual systems.

As apparent from the foregoing descriptions, in accordance with the switching system according to the present invention, both the on-line and standby instructions can be simultaneously transferred to two switching appliances with the simpler circuit arrangement, and furthermore, no extra circuit for reporting the normal/malfunction states of the switching controller is required in the switching controller, which results in a low cost of the switching controller of the switching system.

What is claimed is:

1. A switching system comprising:
   a first electronic appliance selectively operable under a first condition and a second condition;
   a second electronic appliance also selectively operable under the same first condition and second condition;
   a condition-switching controller, including two semiconductors, for simultaneously transferring two condition-switching instruction signals, one of said signals having a first content and the other having a second content, to the first and second electronic appliances, respectively; and
   first and second signal lines connected between the first and second electronic appliances by photocouplers, through which said condition-switching instruction signals are transferred, condition-switching controller being coupled in parallel to each of the first and second electronic appliances via the two signal lines, whereby the first electronic appliance receives one condition-switching instruction signal having the first content to recognize said one instruction signal as said first condition, and simultaneously the second electronic appliance receives the other condition-switching instruction signal having the second content to recognize the other instruction signal as said second condition, the controller also outputting a third signal simultaneously to the first and second electronic appliances indicative of a circuit disconnection and a fourth signal simultaneously to the first and second electronic appliances indicative of a hardware error in the controller.

2. The switching system as claimed in claim 1, wherein said first condition corresponds to an on-line condition, whereas said second condition corresponds to a standby condition.

3. The switching system as claimed in claim 1, wherein said condition-switching controller includes:
   a first switching transistor whose collector is connected to said first signal line, and
   a second switching transistor whose collector is connected to said second signal line.

4. The switching system as claimed in claim 3, wherein said first electronic appliance includes:
   a first photocoupler coupled via said first signal line to said first switching transistor; and,
   a second photocoupler coupled via said second signal line to said second switching transistor;
   said second electronic appliance including:
   a third photocoupler coupled via said first signal line to said first switching transistor; and,
   a fourth photocoupler coupled via said second signal line to said second switching transistor, whereby said one condition-switching instruction signal having the first content is commonly received via the first signal line by both of said first and third photocouplers employed in said first and second electronic appliances respectively, and at the same time, said the other condition-switching instruction signal having the second content is commonly received via the second signal line by both of said second and fourth photocouplers employed in said first and second electronic appliances respectively.

5. The switching system as claimed in claim 1, further comprising:
   a first connector for connecting said condition-switching controller to said first electronic appliance via said first and second signal lines; and,
   a second connector for connecting said condition-switching controller to said second electronic appliance via said first and second signal lines.

6. The switching system of claim 1, in which the semiconductors are transistors.

7. The switching system of claim 1, in which the first and second electronic appliances are computers.

* * * * *